Figure 1:
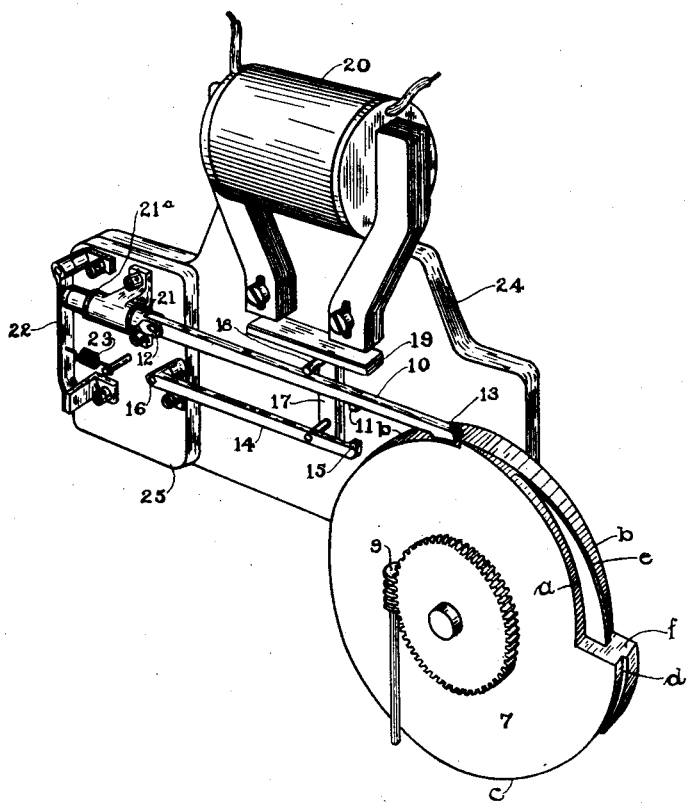

V. KARAPETOFF.
PROTECTIVE DEVICE.
APPLICATION FILED JUNE 28, 1909.

998,343.

Patented July 18, 1911.

2 SHEETS—SHEET 2.

Witnesses
John L. Johnson
Chas. L. Byron

Inventor
Vladimir Karapetoff
By Chas. E. Lord
Attorney

UNITED STATES PATENT OFFICE.

VLADIMIR KARAPETOFF, OF ITHACA, NEW YORK, ASSIGNOR TO ALLIS-CHALMERS COMPANY, A CORPORATION OF NEW JERSEY.

PROTECTIVE DEVICE.

998,343.

Specification of Letters Patent.   Patented July 18, 1911.

Application filed June 28, 1909.   Serial No. 504,830.

*To all whom it may concern:*

Be it known that I, VLADIMIR KARAPETOFF, a citizen of the United States, residing at Ithaca, in the county of Tompkins and State of New York, have invented certain new and useful Improvements in Protective Devices, of which the following is a full, clear, and exact specification.

My invention relates to time limit protective devices for electric circuits.

In the operation of electrical systems of all kinds, it sometimes happens that fairly heavy overloads of short duration occur, while at other times there are moderate overloads of much longer duration. In many systems it is essential that both these kinds of overloads should be permitted if their duration is not too great, the permissible duration for heavy overloads being, of course, less than for lighter overloads. The ordinary circuit-breaker, which trips immediately upon the occurrence of a predetermined overload, is not capable of protecting against these overloads, and yet allowing them to exist for a moderate time without interrupting the circuit. For instance, in one installation a protective device is required which shall open a motor circuit when an overload of 30% has existed for ten minutes, while overloads of 400% lasting not more than half a minute shall not open the motor circuit. To obtain such protection time limit devices are necessary. A number of time limit devices have been proposed, but all of these, so far as I know, are open to some objection.

It is the object of my present invention to provide a time limit device which will operate to cause proper protective action to be taken when an abnormal condition has existed in an electric circuit for a time which varies inversely as the extent of the abnormality of such condition; and which is self-restoring if the abnormal condition ceases before such time has expired. The usual abnormal condition to be protected against is an overload on the circuit.

In the preferred form of my invention there is a motor which is so connected that it begins to rotate in one direction when the value of the current in the circuit to be protected exceeds a predetermined value, and during the continuance of such excessive current rotates at a speed which varies as the value of the current in such circuit, and protective means which are rendered operative upon a predetermined movement of the motor. The protective means is usually rendered operative by the closing of a control circuit. The protective means may in some cases be a mere bell or other signal, but preferably there is a switch in the circuit to be protected, which switch is caused to be opened automatically upon the aforesaid predetermined movement of the motor. If desired, there may be both a signal and a switch. Connections are also preferably provided whereby upon the cessation of the overload before it has continued long enough to allow the motor to complete the movement necessary for it to cause the operation of the protective means, a circuit is completed to cause the motor to rotate backward to its normal position, and to stop there.

The various novel features of my invention will be apparent from the following description and accompanying drawings and will be particularly pointed out in the claims.

Figure 2:
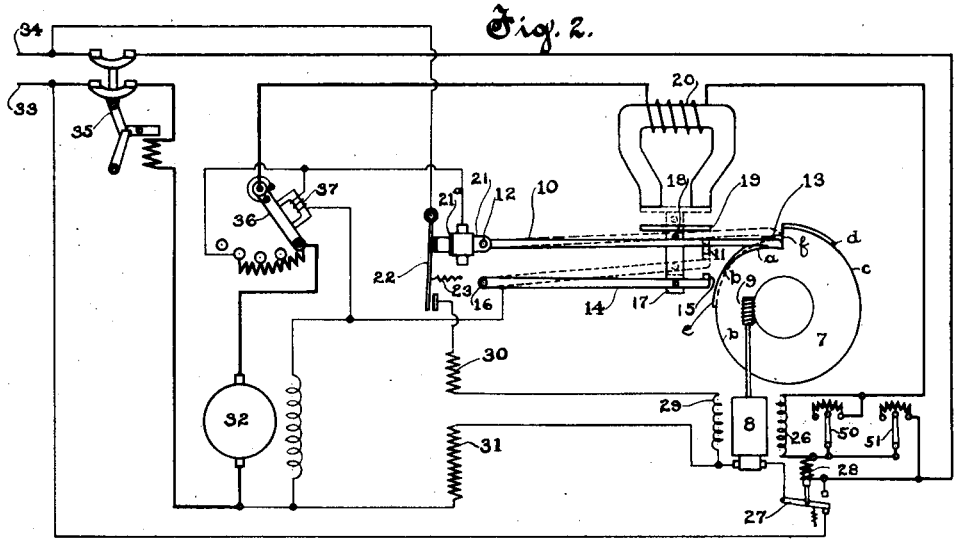
Figure 3:
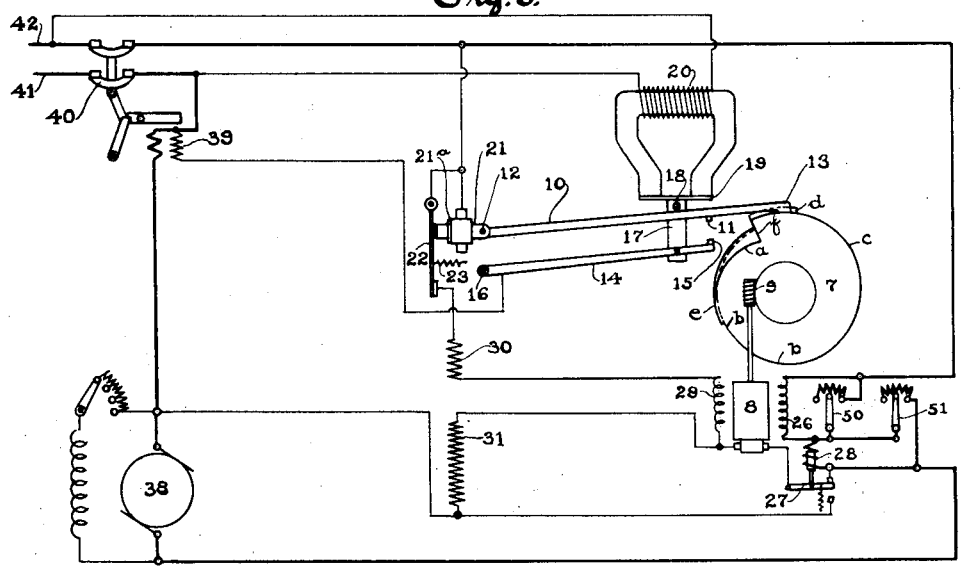

Figure 1 is a perspective view of the preferred form of my time limit device; and Figs. 2 and 3 are diagrams showing two ways in which such device may be connected to the circuit.

My time limit device in its preferred form consists primarily of a cam 7, preferably of insulating material, arranged to be driven by a motor 8 through any desired gearing. This gearing is here shown as worm gearing 9. A lever 10 carrying a contact 11 is rather loosely pivoted at 12, its free end 13 resting upon the periphery of the cam 7. This loose pivoting allows a slight sidewise movement of the lever 10. A second lever 14 carrying a contact 15 is pivoted at 16. A block 17, of insulating material, is pivoted to the free end of the lever 14, and carries a pin 18 extending over the lever 10, and an armature 19 for an electromagnet 20. This armature is preferably faced with copper to prevent sticking. The winding of the magnet 20 may be connected either in series with the circuit to be protected as shown in Fig. 2 or in shunt thereto as shown in Fig. 3. The free end of the lever 14 is always supported, through block 17 either by the lever 10 or by the electromagnet 20. The pivot 12 is on a slide 21 which abuts against the movable member 22 of an auxiliary switch which is biased to closed position by a spring 23. A collar 21ª limits the movement of the slide 21 to the right. The several parts of the time limit device, with the exception of the time motor 8, are preferably supported on a plate 24, on which some or all of them may be adjustable. The electromagnet 20 is shown adjustable. If the plate 24 is of conducting material it preferably carries an auxiliary plate 25 of insulating material, on which are mounted the pivot 16, the slide 21, and the auxiliary switch 22, with the necessary binding posts for connecting them in circuit.

The motor 8 has its main field winding 26 connected in series with the circuit to be protected, and one terminal of its armature connected to an electromagnetic switch 27 controlled by a magnet 28 also in series with such circuit. The two fixed contacts of the electromagnetic switch 27 are respectively connected directly to the two sides of the line. The other armature terminal of the motor 8 is connected to one side of the line through an auxiliary field winding 29, a resistance 30, and the auxiliary switch 22, and to the other side of the line through a resistance 31. For reasons hereinafter apparent, the resistance 31 has a larger resistance and the armature 8 a much smaller resistance than have the resistance 30 and auxiliary field winding 29 together.

The time limit device above described may be connected in circuit in various ways, according to the work desired of it. In Fig. 2 it is shown as connected in circuit for protecting an electric motor 32, which is connected to the line 33—34 through an overload circuit-breaker 35 and a starting box 36, the terminals of the no-voltage release magnet 37 of the starting box being connected to the contacts 11 and 15 respectively. Here the upper contact of the switch 22 and the lower fixed contact of the switch 27 are respectively connected to the two sides of the line on the generator side of the circuit-breaker 35, so that the motor 8 can move backward even though the motor 32 is disconnected. In Fig. 3 the time limit device is shown connected to a dynamo-electric machine 38, the two contacts 11 and 15 being here connected in the circuit of an auxiliary trip coil 39 of the circuit-breaker 40, through which the machine is connected to the line 41—42. The machine 38 may be either a generator or a motor, the connections illustrated, however, being arranged particularly for a generator.

The operation of the device is as follows: The several parts of the time limit device are normally in the position shown in full lines in Fig. 2. The motor 8, its armature circuit having been completed through the switch 22, the resistance 30, the auxiliary field winding 29, and the switch 27 in its lower position, has previously driven the cam 27 in a counter clock-wise direction until the radial face $f$ of the cam has engaged the end of the lever 10 and forced it and the slide 21 to the left to open the switch 22 and deënergize the armature of the motor 8. The air gaps between the poles of the magnet 20, and the armature 19 are so proportioned that the magnet 20 with the parts in this position is unable to raise such armature for any value of current through the winding of the magnet. If the current in the circuit to be protected rises beyond the value, say 30% overload, for which the switch 27 is set, said switch is moved upward to close its upper contact, thus completing the circuit of the motor 8 through the resistance 31 and causing the motor to drive the cam 7 in a clockwise direction. As soon as this movement has started the spring 23 closes the switch 22 and completes the circuit of the auxiliary field winding 29, but because at this time this winding and the resistance 30 are practically short-circuited by the armature 8 this is substantially without effect. The resistance 31 being large as compared with the resistance of the armature 8, the current in the armature remains substantially constant regardless of the strength of the field in which it is located, and therefore the speed of the motor 8 varies directly in proportion to the current in its field winding 26, which is in series with the circuit to be protected. In this respect the motor 8 is substantially like the motors used in the ordinary watt-hour meters. As the overload continues, the motor 8 drives the cam 7 in a clockwise direction, and the cam surfaces $a$ and $b$ on the cam raise the levers 10 and 14 gradually, until, when the high point $c$ of the cam comes under the end 13 of the lever 10, the armature 19 has been brought practically against the poles of the electromagnet 20 or so close to such poles that the armature will be lifted and held up for practically any value of current through the winding of the magnet 20. If the overload continues long enough for the cam 7 to make a complete revolution, the radial face $f$ allows the lever 10 to drop very nearly but not quite to the normal position, shown in full lines in Fig. 2, so that the contacts 11 and 15 engage, the magnet 20 holding up the lever 14 and also, through the engagement of the contacts 11 and 15, carrying the weight of the lever 10 after the latter has dropped. The reason why the lever 10 is preferably not permitted to drop quite to its normal position is that the weight of such lever at this time may be taken by the contacts 11 and 15 rather than by the cam 7, so that good contact may be obtained. The guide $d$ guides the end 13 of the lever 10 so that upon dropping it will be over the cam surface $a$ rather than over the cam surface $b$. In Fig. 3 the parts are shown as they would appear just before the radial face $f$ is reached; and in Fig. 2 the lever 14 and armature 19 are shown in dotted lines in the same position, which they retain after such radial face has been reached. The engagement of the contacts 11 and 15 renders the protective means immediately operative; for instance by short-circuiting the no-voltage coil 37 in the arrangement shown in Fig. 2 and thus causing the starting box 36 to interrupt the circuit of the motor 32, or by completing the circuit for the tripping coil 39 of the circuit-breaker 40 in the arrangement shown in Fig. 3 and thus causing the tripping of said circuit-breaker to disconnect the machine 38 from the line 41—42. Upon the interruption of the main circuit the magnets 20 and 28 are deënergized and the lever 14 and switch 27 allowed to drop. The armature of the motor 8 is now energized momentarily and moves the cam 7 slightly in a counter-clockwise direction to open the switch 22 thus deenergizing itself and restoring the parts to normal position.

The time required for the cam 7 to make the complete revolution necessary to cause the engagement of the contacts 11 and 15 varies in inverse proportion to the current, the product of the time and the current being constant. For instance, assume that the normal load is 100 amperes, that the switch 27 is raised at a 30% overload, and that the 30% overload is to be allowable for ten minutes before causing the interruption of the circuit. This means that the switch 27 must be raised against its upper contact long enough for 1300 ampere minutes to be supplied. But if the overload is 400%, making the current 500 amperes, the interruption of the circuit will take place in two and three-fifths minutes, which is the time required to obtain 1300 ampere minutes at the 400 percent overload. For overloads exceeding a predetermined maximum value, say 400%, the usual overload trip coil of the circuit-breaker 35 or 40 trips such circuit-breaker to cause it to interrupt the circuit immediately. But suppose an overload sufficient to raise the switch 27 but not sufficient to trip the circuit-breaker 35 or 40 continues for less time than is required for the cam 7 to make a complete revolution. In such case the switch 27 drops upon the cessation of the overload, completing the circuit of the armature of the motor 8 through the switch 22, resistance 30, and auxiliary field winding 29, and causing said motor to drive the cam 7 in a counter-clockwise direction. If the overload had not continued long enough for the cam surface $a$ to pass entirely from under the end 13 of the lever 10, the end 13 remains on the cam surface $a$ during such counter-clockwise movement of the cam. The cam surface $a$ is at no point high enough to raise the armature 19 sufficiently to bring it within range of the magnet 20 for any value of current in the winding of such magnet. If the overload had continued long enough to allow the end 13 of the lever 10 to drop from the cam surface $a$ to the cam surface $b$, (where it is shown in dotted lines in Fig. 2,) the counter-clockwise movement of the cam 7 causes the guide $e$ of the cam to keep the end 13 on the cam surface $b$ and prevent it from returning to the cam surface $a$. This prevents the lever 10 from dropping to bring the contact 11 against the contact 15 in case the cam 7 had gotten far enough to allow the armature 19 to be lifted and held up by the magnet 20, as shown in dotted lines in Fig. 2. In either case the counter-clockwise movement of the cam 7 continues until the radial face $f$ of the cam strikes the end of the lever 10 and forces the slide 21 to the left to open the switch 22. By reason of the auxiliary winding 29 and of the connection of the upper contact of the switch 22 and of the lower contact of the switch 27 to points on the mains 33 and 34 or 41 and 42 respectively which are on the generator side of the circuit-breaker 35 or 40, the counter-clockwise movement of the cam 7 is obtained and caused to continue even if there is no current in the field winding 26, and indeed even if the circuit-breaker 35 or 40 is open.

Various means for adjusting the several parts may be provided. For instance, the speed at which the motor 8 travels may be adjusted by the rheostat 50 in shunt to the main field winding 26, while the value of the overload at which the switch 27 is raised is adjustable by a rheostat 51 in shunt to the coil 28 of such switch.

While I have particularly described my invention as applied to the protection of motors and generators, it is not limited to such application. It may be used in connection with any kind of circuit, and whether main or branch.

Although I have shown my time limit device as applied to direct current circuits, it is equally applicable for single phase or polyphase alternating current circuits. Any suitable type of motor may be used for driving the cam 7.

In the specification and in the claims the expression "varies as" is not intended to mean a strict proportional variation. When proportional variation is meant, it is explicitly stated.

Many other modifications may be made in the arrangement shown and described, and all such which do not involve a departure from the spirit and scope of my invention I aim to cover in the following claims.

What I claim as new is:

1. In combination, a circuit, a motor, connections operative when the current in said circuit exceeds a predetermined value for energizing said motor to cause it to rotate in one direction at a speed which varies as the current in said circuit, and connections operative when the current in said circuit falls below such predetermined value for energizing the motor to cause it to rotate in the opposite direction.

2. In combination, a circuit, a motor, connections operative when the current in said circuit exceeds a predetermined value for energizing said motor to cause it to rotate in one direction at a speed which varies as the current in said circuit, connections operative when the current in said circuit falls below such predetermined value for energizing the motor to cause it to rotate in the opposite direction, and a switch arranged to be operated when said motor has made a predetermined number of revolutions from an initial position in said first mentioned direction.

3. In combination, a circuit, a motor, connections operative when the current in said circuit exceeds a predetermined value for energizing said motor to cause it to rotate in one direction at a speed which varies as the current in said circuit, connections operative when the current in said circuit falls below such predetermined value for energizing the motor to cause it to rotate in the opposite direction, and means whereby said circuit is opened when said motor has made a predetermined number of revolutions from an initial position in said first mentioned direction.

4. In combination, a circuit, a motor, connections operative upon a predetermined abnormal condition in said circuit for energizing said motor to drive it in one direction from an initial position at a speed proportional to the extent of said abnormal condition, and connections operative upon the cessation of such abnormal condition for energizing said motor to drive it in the opposite direction to said initial position.

5. In combination, a circuit, a motor, connections operative upon a predetermined abnormal condition in said circuit for energizing said motor to drive it in one direction from an initial position at a speed proportional to the extent of said abnormal condition, connections operative upon the cessation of such abnormal condition for energizing said motor to drive it in the opposite direction to said initial position, and a switch arranged to be closed when said motor has made a predetermined number of revolutions in said first mentioned direction from said initial position.

6. In combination, a circuit, a motor, connections operative upon a predetermined abnormal condition in said circuit for energizing said motor to drive it in one direction from an initial position at a speed proportional to the extent of said abnormal condition, connections operative upon the cessation of such abnormal condition for energizing said motor to drive it in the opposite direction to said initial position, and means for interrupting said circuit when said motor has made a predetermined number of revolutions from said initial position in said first mentioned direction.

7. In combination, a circuit, a motor, means operative upon a predetermined overload on said circuit for energizing said motor for movement in one direction from an initial position, means operative upon the cessation of such overload for energizing said motor for movement in the opposite direction, means for stopping said latter movement when said motor has reached its initial position, and means for interrupting said circuit upon a predetermined movement of said motor in said first mentioned direction from its initial position.

8. In combination, a circuit, a motor, mean operative upon a predetermined overload on said circuit for energizing said motor for movement in one direction from an initial position, means operative upon the cessation of such overload for energizing said motor for movement in the opposite direction, means for stopping said latter movement when said motor has reached its initial position, and a switch arranged to be closed upon a predetermined movement of said motor in said first mentioned direction.

9. In a time limit device, the combination of a movable member, electromagnetic means for moving said member in both directions, means for energizing said means to move said member in one direction from an initial position upon a predetermined abnormal condition in a circuit and for energizing it to return said member to its initial position upon the cessation of said abnormal condition, the speed of said movable member in said first mentioned direction being determined by the extent of said abnormal condition, and a switch arranged to be operated upon a predetermined movement of said movable member in said first mentioned direction from its initial position.

10. In a time limit device, the combination of a movable cam, a movable contact supported by said cam, a second movable contact also normally supported by said cam out of engagement with the first contact, both said contacts being moved by movements of the cam, and an electromagnet for holding said second contact in a predetermined position when such contact has been brought into or near such position by a movement of the cam, the position in which such second contact is held by said magnet being such that such contact may be engaged by the first contact upon certain movements of the cam.

11. In a time limit device, the combination of a rotatable cam, a pair of contacts supported out of engagement with each other by said cam and moved by movements of said cam, an electromagnet for holding one of said contacts in a certain position when it has been brought sufficiently close to such position by said cam, this position of said last mentioned contact being such that upon a predetermined movement of the cam the other contact engages it.

12. In combination, a circuit, a movable member, a motor driving said movable member, and means for energizing said motor to drive said movable member in one direction when the current in said circuit exceeds a predetermined value, the speed of said movable member being determined by the value of such excessive current, and for energizing said motor to drive said movable member in the other direction when the value of the current in such circuit falls below such predetermined value.

13. In combination, a circuit, a movable member, a motor driving said movable member, means for energizing said motor to drive said movable member in one direction when the current in said circuit exceeds a predetermined value, the speed of said movable member being determined by the value of such excessive current, and for energizing said motor to drive said movable member in the other direction when the value of the current in such circuit falls below such predetermined value, and means for deënergizing said motor when said movable member has been moved in said last mentioned direction to a predetermined position.

14. In combination, a circuit, a movable member, a motor driving said movable member, means for energizing said motor to drive said movable member in one direction when the current in said circuit exceeds a predetermined value, the speed of said movable member being determined by the value of such excessive current, and for energizing said motor to drive said movable member in the other direction when the value of the current in such circuit falls below such predetermined value, and a control circuit which is energized upon a predetermined movement of said movable member in the first mentioned direction.

15. In combination, a circuit, a movable member, a motor driving said movable member, means for energizing said motor to drive said movable member in one direction when the current in said circuit exceeds a predetermined value, the speed of said movable member being determined by the value of such excessive current, and for energizing said motor to drive said movable member in the other direction when the value of the current in such circuit falls below such predetermined value, means for deënergizing said motor when said movable member has been moved in said last mentioned direction to a predetermined position, and a control circuit which is energized upon a predetermined movement of said movable member in said first mentioned direction from the position at which the motor is deënergized when said member is moved in the opposite direction.

16. In combination, a circuit, a movable member, a motor driving said movable member, means for energizing said motor to drive said movable member in one direction when the current in said circuit exceeds a predetermined value, the speed of said movable member being determined by the value of such excessive current, and for energizing said motor to drive said movable member in the other direction when the value of the current in such circuit falls below such predetermined value, and means rendered operative to interrupt said circuit upon a predetermined movement of said movable member in said first direction.

17. In combination, a circuit, a movable member, a motor driving said movable member, means for energizing said motor to drive said movable member in one direction when the current in said circuit exceeds a predetermined value, the speed of said movable member being determined by the value of such excessive current, and for energizing said motor to drive said movable member in the other direction when the value of the current in such circuit falls below such predetermined value, means for deënergizing said motor when said movable member has been moved in said last mentioned direction to a predetermined position, and means rendered operative to interrupt said circuit upon a predetermined movement of said movable member in the first direction from the position at which the motor is deënergized when said member is moved in the opposite direction.

18. In combination, a circuit, a movable member, a motor mechanically connected to drive said movable member, means for energizing said motor to drive said movable member in opposite directions according as the current in said circuit is above or below a predetermined value, a control circuit arranged to be energized upon a predetermined movement of said movable member in the direction in which it is moved when the current in said first mentioned circuit exceeds said predetermined value, and means operative upon the energization of said control circuit for interrupting said first mentioned circuit.

19. In combination, a circuit, a movable member, a motor mechanically connected to drive said movable member, means for energizing said motor to drive said movable member forward and backward according as the current in said circuit is above or below a predetermined value, means for deënergizing said motor when said movable member reaches a predetermined point in its backward movement, protective means for said circuit, and means for causing the operation of said protective means when said movable member reaches a predetermined point in its forward movement.

20. In combination, a circuit, a motor, a switch for connecting one terminal of one element of said motor to one side of said circuit when the current in said circuit exceeds a predetermined value and to the other side of said circuit when the current in said circuit is less than such predetermined value, and two resistances connected between the other terminal of said motor element and the two sides of said circuit respectively.

21. In combination, a circuit, a motor, a switch for connecting one terminal of one element of said motor to one side of said circuit when the current in said circuit exceeds a predetermined value and to the other side of said circuit when the current in said circuit is less than such predetermined value, resistances through which the other terminal of said motor element is connected to both sides of said circuit, a movable member driven by said motor, and means for interrupting the connection of the second terminal of said motor element to one side of the circuit upon a predetermined movement of said movable member.

22. In combination, a circuit, a motor having one element in series with said circuit, means for causing current to flow through the other element of said motor in one direction or the other according as the current in said circuit is above or below a predetermined value, a movable member driven by said motor, means for cutting off the current through the second element of said motor when said movable member reaches a predetermined position in its movement in one direction, and means for interrupting said circuit when said movable member reaches a predetermined position in its movement in the opposite direction.

23. In combination, a circuit, a motor having one element in series with said circuit, means for causing current to flow through the other element of said motor in one direction or the other according as the current in said circuit is above or below a predetermined value, a movable member driven by said motor, means for cutting off the current through the second element of said motor when said movable member reaches a predetermined position in its movement in one direction, and a control circuit arranged to be energized when said movable member reaches a predetermined position in its movement in the other direction.

24. In combination, a motor, a member driven thereby, a pair of circuit terminals arranged to be closed only upon a predetermined movement of said member in one direction from a certain position, and means for supplying current to said motor to cause it to rotate to drive said member in the aforesaid direction upon the occurrence of a predetermined abnormal condition and to cause it to rotate to drive said member in the other direction back to its initial position if said abnormal condition ceases before said member has made such predetermined movement.

25. In a time limit device, the combination of a rotary cam, electromagnetic means for moving said cam in one direction upon a predetermined overload on a circuit, the speed of such movement being determined by the extent of such abnormal condition, and in the other direction when such overload ceases, and a switch arranged to be operated when the cam in such movement reaches a predetermined position.

26. In a time limit device, the combination of a rotary cam, electromagnetic means for moving said cam in one direction when the current in a circuit exceeds a predetermined value, the speed of such movement varying as the value of such current, and in the other direction when the current falls below such value, and a pair of contacts arranged to be brought into engagement when the cam in such movement reaches a predetermined position.

Milwaukee, Wis., June 16, 1909.

In testimony whereof I affix my signature, in the presence of two witnesses.

VLADIMIR KARAPETOFF.

Witnesses:
 FRED H. KROGER,
 A. D. DU BOIS.

---

Copies of this patent may be obtained for five cents each, by addressing the "Commissioner of Patents, Washington, D. C."

It is hereby certified that in Letters Patent No. 998,343, granted July 18, 1911, upon the application of Vladimir Karapetoff, of Ithaca, New York, for an improvement in "Protective Devices," errors appear in the printed specification requiring correction as follows: Page 4, line 87, for the word "mean" read *means;* and page 5, line 112, strike out the words and syllable "a predetermined value, a control circuit ar-" and after line 114 as now numbered, insert the words and syllable *a predetermined value, a control circuit, ar-;* and that the said Letters Patent should be read with these corrections therein that the same may conform to the record of the case in the Patent Office.

Signed and sealed this 17th day of October, A. D., 1911.

[SEAL.]

C. C. BILLINGS,
*Acting Commissioner of Patents.*